July 27, 1926.
A. G. CARTER
PULLEY COVER
Filed May 11, 1925
1,593,751
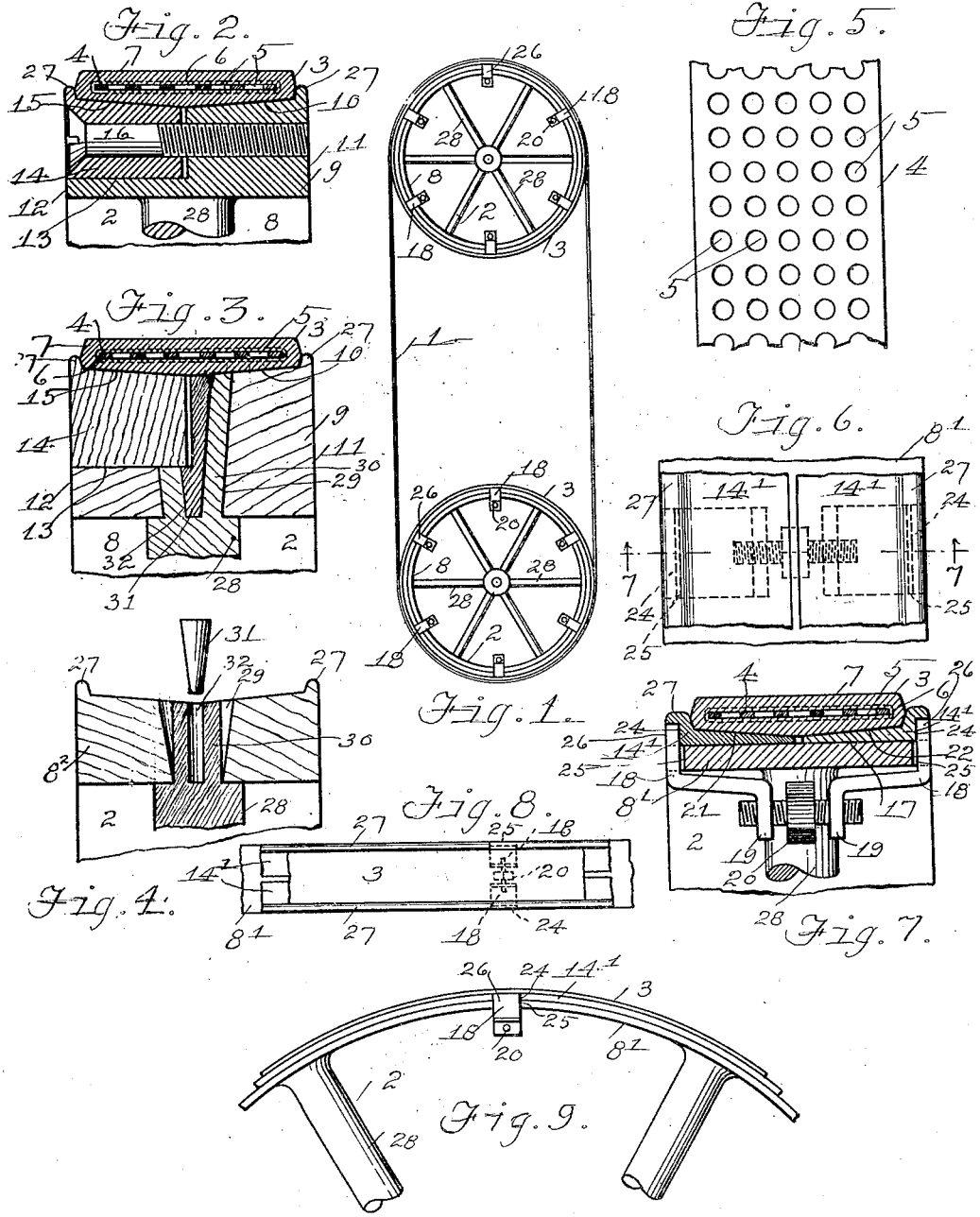
INVENTOR.
Andrew G. Carter
BY
Cyrus W. Rice
ATTORNEY.
Witness:
J. J. Hagerten Patented July 27, 1926.

1,593,751

UNITED STATES PATENT OFFICE.

ANDREW G. CARTER, OF GRAND RAPIDS, MICHIGAN.

PULLEY COVER.

Application filed May 11, 1925. Serial No. 29,638.

The present invention relates to pulley covers; and its object is to provide such covers improved in various respects hereinafter appearing.

This and any other and more specific objects hereinafter appearing are attained by, and the invention finds preferable embodiment in, the structure or structures hereinafter particularly described in the body of this specification and illustrated by the accompanying drawings, in which:—

Figure 1 is a side view of a pair of pulleys and a band saw carried thereon;

Figure 2 is a transverse sectional view of the felloe or "rim" of a band saw-pulley and parts carried thereby;

Figure 3 is another transverse sectional view of such a felloe and parts carried thereby taken on another axial plane;

Figure 4 is another transverse sectional view of such a felloe illustrating a method of securing the same to the spokes of the pulley;

Figure 5 is a view of a portion of the wide thin metallic band in the middle of the pulley cover;

Figure 6 is a view of a modified construction of means for mounting the pulley cover on the pulley, looking toward the pulley's axis;

Figure 7 is a transverse sectional view of the same and of the pulley cover carried thereby, taken on line 7—7 of Figure 6;

Figure 8 is a view of a portion of the same parts, looking toward the pulley's axis; and Figure 9 is a side view of the same.

In the embodiment of the invention illustrated by the drawings, a band-saw 1 is shown carried by the pulleys 2, 2. These pulleys are provided with flexible and resilient pulley covers, designated generally 3, carrying the band saw, these pulley covers comprising a wide, thin, flexible but non-stretchable metallic band 4 having perforations 5, a fibrous envelop 6 made of canvas or the like surrounding this band, and an outer envelop 7 of rubber molded around the same and preferably in such manner that the rubber may permeate the fibrous envelop 6 and engage in the perforations 5, causing the fabric adjacent these perforations to be pressed into engagement with the perforations, to hold the envelops from slipping on this metallic band.

It will be seen that a pulley cover is thus provided having a rigidity lengthwise and edgewise sufficient to maintain the tire in proper form, the pulley cover being nevertheless sufficiently flexible and resilient in the radial directions of the pulleys on which it is carried to properly cushion the saw in its operation. The pulley's felloe 8 is so formed that the pulley cover may be readily mounted thereon and demounted, and when mounted may be held against edgewise movement.

In Figure 2, a felloe is shown having a body portion 9 with a peripheral surface 10 extending from one side 11 of the pulley inclinedly toward the pulley's axis and toward a plane extending transversely of said axis intermediate (midway between) the pulley's opposite sides 11, 12. This felloe has a concentric circular socket 13 extending radially from its periphery, and in the axial direction of the pulley from its side 12. An annular member 14 is carried in this socket slidably in the direction of the pulley's axis, and has a peripheral surface 15 extending from the side 12 of the pulley inclinedly toward the pulley's axis and toward said plane, the peripheral surface 15 of this annular member being thus inclined oppositely to the peripheral surface 10 of the body portion 9 of the felloe. Threaded means, as the screw 16 passing through the annular member 14 and threaded in the body portion 9 of the felloe, serves to detachably connect these parts together and to slide and hold the annular member in a position properly retaining the pulley cover edgewise on the pulley.

In Figures 6, 7, 8 and 9, a modified construction is shown particularly well adapted for the application of my pulley holding means to a pulley having a felloe $8^1$ whose periphery is cross-sectionally flat. In this construction, a pair of annular members $14^1$ are applied to and carried by the felloe's peripheral surface 17 slidably in the pulley's axial direction. A clamp comprising a pair of clamp members 18, 18 engage at their outer ends these annular members respectively, and extend laterally of the felloe and then approachingly along its inner side to angularly disposed inner ends 19, 19 threaded to receive the turnbuckle 20 which may be turned to draw these clamp members together. These annular members $14^1$ are shown provided with peripheral surfaces 21, 22 disposed similarly to the surfaces 15 and 10 of the annular member 14 and body portion 9 respectively of the construction shown in other views.

The annular member 14¹ is provided with a recess 24 and the felloe 8¹ with a registering recess 25 in which engage the radially-extending portion 26 of the clamp member 18, in order to hold the annular member against turning on the felloe.

Radially extending circular ribs 27 may be provided to more securely hold the pulley covers against edgewise movement.

A method for securely fastening the pulley's spokes 28 in the felloe is shown in Figure 4, the felloe 8² having an opening 29 tapering toward the pulley's axis. The shouldered end 30 of the spoke is inserted into this opening, whereupon a wedge 31 is driven into a bore 32 therein to expand the spoke into contact with said opening.

The invention being intended to be pointed out in the claim, is not to be limited to or by details of construction of any particular embodiment thereof illustrated by the drawings or hereinbefore described.

I claim:

A resilient pulley cover comprising a wide thin perforated non-stretchable metallic band, a fibrous envelop therearound and a rubber envelop molded around the fibrous envelop in such manner as to permeate the same and engage in the perforations of said band.

In testimony whereof I have hereunto set my hand at Grand Rapids, Michigan, this 8th day of May, 1925.

ANDREW G. CARTER